United States Patent
Kuo et al.

(10) Patent No.: US 9,152,910 B2
(45) Date of Patent: Oct. 6, 2015

(54) RFID TAG STRUCTURE HAVING ANTI-REUSE FUNCTION AND MANUFACTURE METHOD THEREOF

(75) Inventors: Chia-Ming Kuo, Hsinchu County (TW); Cheng-Han Lee, Taoyuan County (TW)

(73) Assignee: FAVITE INC., Jhubei (TW)

( * ) Notice: Subject to any disclaimer, the term of this patent is extended or adjusted under 35 U.S.C. 154(b) by 252 days.

(21) Appl. No.: 13/595,439

(22) Filed: Aug. 27, 2012

(65) Prior Publication Data

US 2013/0068842 A1    Mar. 21, 2013

(30) Foreign Application Priority Data

Sep. 16, 2011    (TW) .............................. 100133335 A

(51) Int. Cl.
*G06K 19/06* (2006.01)
*G06K 19/073* (2006.01)
*G06K 19/077* (2006.01)

(52) U.S. Cl.
CPC ........ *G06K 19/0739* (2013.01); *G06K 19/0776* (2013.01); *G06K 19/07722* (2013.01); *G06K 19/07798* (2013.01)

(58) Field of Classification Search
USPC ......... 235/487, 488, 492, 493; 340/10.1, 572; 427/123, 125
See application file for complete search history.

(56) References Cited

U.S. PATENT DOCUMENTS

| | | | | |
|---|---|---|---|---|
| 6,421,013 | B1* | 7/2002 | Chung | 343/700 MS |
| 2002/0036237 | A1* | 3/2002 | Atherton et al. | 235/492 |
| 2007/0126586 | A1* | 6/2007 | Ohtaka | 340/572.7 |
| 2011/0226511 | A1* | 9/2011 | Matsushita | 174/250 |
| 2011/0240482 | A1* | 10/2011 | Satou et al. | 205/164 |

* cited by examiner

*Primary Examiner* — Michael G Lee
*Assistant Examiner* — Tabitha Chedekel
(74) *Attorney, Agent, or Firm* — Guice Patents PLLC

(57) ABSTRACT

The present invention provides a RFID tag structure having anti-reuse function, comprising a substrate; a pattern formed on a surface of the substrate; and an adhesive layer provided on a surface of the pattern which is not in contact with the substrate, wherein the adhesive forces of the adhesive layer are stronger than the binding strengths generated between the pattern and the substrate, and the adhesive layer is capable of being adhered on an article to be adhered and a RFID tag is formed thereby; when the RFID tag is separated from the article to be adhered, the substrate is released from the article to be adhered, the pattern and the adhesive layer are still remained on the article to be adhered, thereby preventing the RFID tag from being reused and fulfilling the objective of anti-reuse and anti-counterfeit. The present invention also provides a manufacture method thereof.

5 Claims, 4 Drawing Sheets

RFID TAG STRUCTURE HAVING ANTI-REUSE FUNCTION AND MANUFACTURE METHOD THEREOF

BACKGROUND OF THE INVENTION

1. Field of the Invention

The present invention relates to a RFID tag structure and manufacture method thereof, especially to a RFID tag structure having anti-reuse function and manufacture method thereof capable of fulfilling the objective and purpose of anti-reuse.

2. Description of Related Art

A radio frequency identification (RFID) tag can be used to record the production locations, manufacture procedure, logistic quality control and other management purposes, and the specified codes in a chip contained in the tag can be used for fulfilling anti-counterfeit function. As such, utilizing the RFID tag to perform product identification for fulfilling the purpose of anti-reuse and anti-counterfeit is a main stream in the marketplace.

Referring to FIG. 1, which is a schematic view illustrating the application of a conventional RFID tag. As shown in FIG. 1, when a conventional RFID tag 100 is used, the RFID tag 100 is adhered on an article 200 to be adhered, wherein the adhered article 200 is e.g. but not limited to a plastic film, and several cutting lines 210 are formed on the RFID tag under the condition of not breaking the natural function of the RFID tag 100; when the RFID tag 100 is desired to be separated from the adhered article 200, a pattern 110 formed on the RFID tag 100 would be broken along the cutting lines 210, thereby fulfilling the objective of anti-counterfeit and preventing the RFID tag from being reused. However, if a person carefully and intentionally removes the RFID tag 100, the pattern 110 can still be completely remained after the removal, so the RFID tag 100 may be reused, thereby the uniqueness of the RFID tag 100 is no longer provided.

SUMMARY OF THE INVENTION

One primary objective and purpose of the present invention is to provide a RFID tag structure having anti-reuse function and manufacture method thereof; the present invention enjoys the differentiation of adhesive forces and binding strengths generated by different materials, so when a RFID tag which had been adhered on a flat surface is desired to be separated, a pattern formed on the RFID tag is released from a substrate because of the weaker binding strengths generated between the pattern and the substrate, and the RFID tag can be prevented from being reused, thereby fulfilling the objective and purpose of anti-reuse and anti-counterfeit.

For fulfilling the objective and purpose described above, the present invention provides a RFID tag structure having anti-reuse function, which comprises: a substrate; a pattern formed on a surface of the substrate; and an adhesive layer provided on a surface of the pattern which is not in contact with the substrate, wherein the adhesive forces of the adhesive layer are stronger than the binding strengths generated between the pattern and the substrate, and the adhesive layer is capable of being adhered on an article to be adhered and a RFID tag is formed thereby; when the RFID tag is separated from the article to be adhered, the substrate is released from the article to be adhered, and the pattern and the adhesive layer are still remained on the article to be adhered, thereby preventing the RFID tag from being reused.

For fulfilling the objective and purpose described above, the present invention provides a manufacture method of RFID tag structure having anti-reuse function, which includes steps of: printing adopted ink containing catalyst on a substrate thereby forming a pattern; drying or baking such ink to cause such ink to react with the substrate and the binding strengths can be generated thereby; immersing the substrate on which such ink printed in a solution containing metallic ions, and the catalyst contained in such ink can facilitate the reaction of the metallic ions contained in the solution to cause the metal to be deposited on the ink and the pattern equipped with electric conductive function can be formed thereby; thereafter, applying an adhesive layer having the adhesive forces on such pattern, wherein such adhesive forces shall be stronger than such binding strengths.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
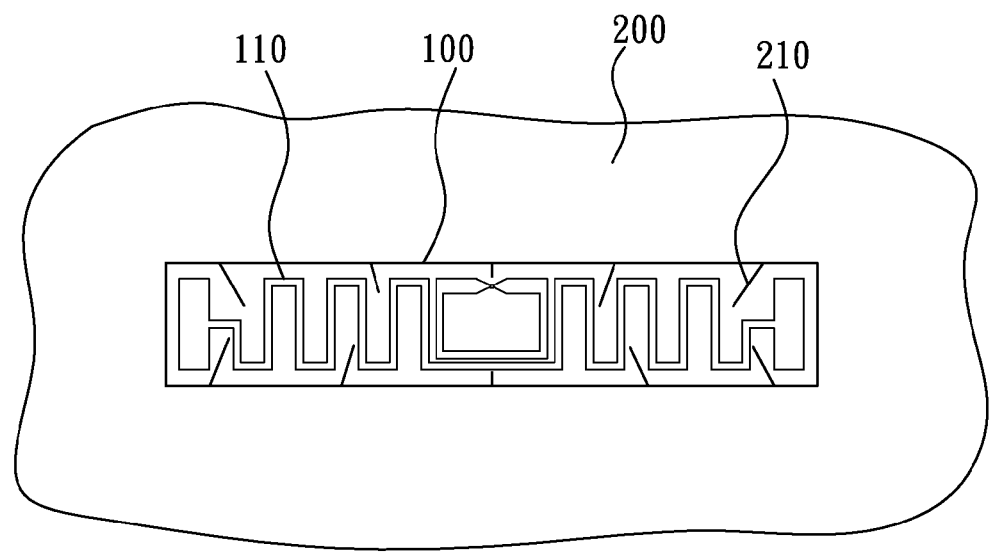
FIG. 1 is a schematic view illustrating the application of a conventional RFID tag.
Figure 2:
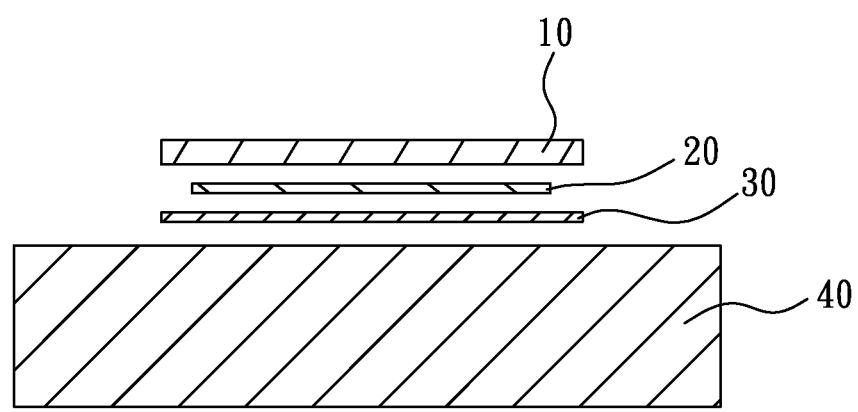
FIG. 2 is a schematic cross sectional view illustrating the RFID tag structure having anti-reuse function according to one preferred embodiment of the present invention.
Figure 3:
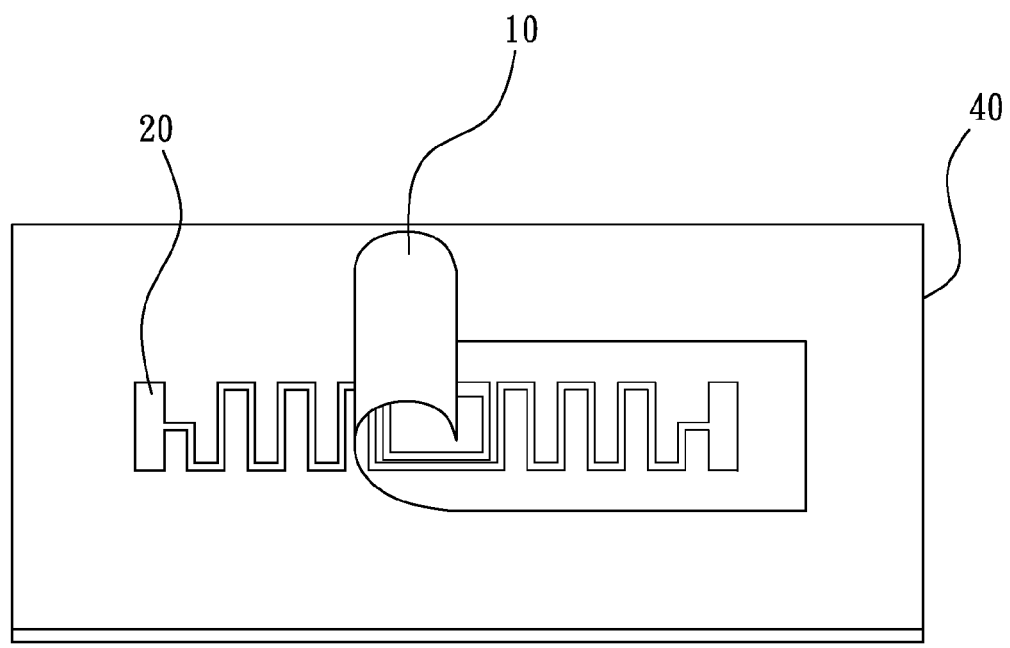
FIG. 3 is a schematic view illustrating the RFID tag structure having anti-reuse function being separated from an article to be adhered according to one preferred embodiment of the present invention.
Figure 4:
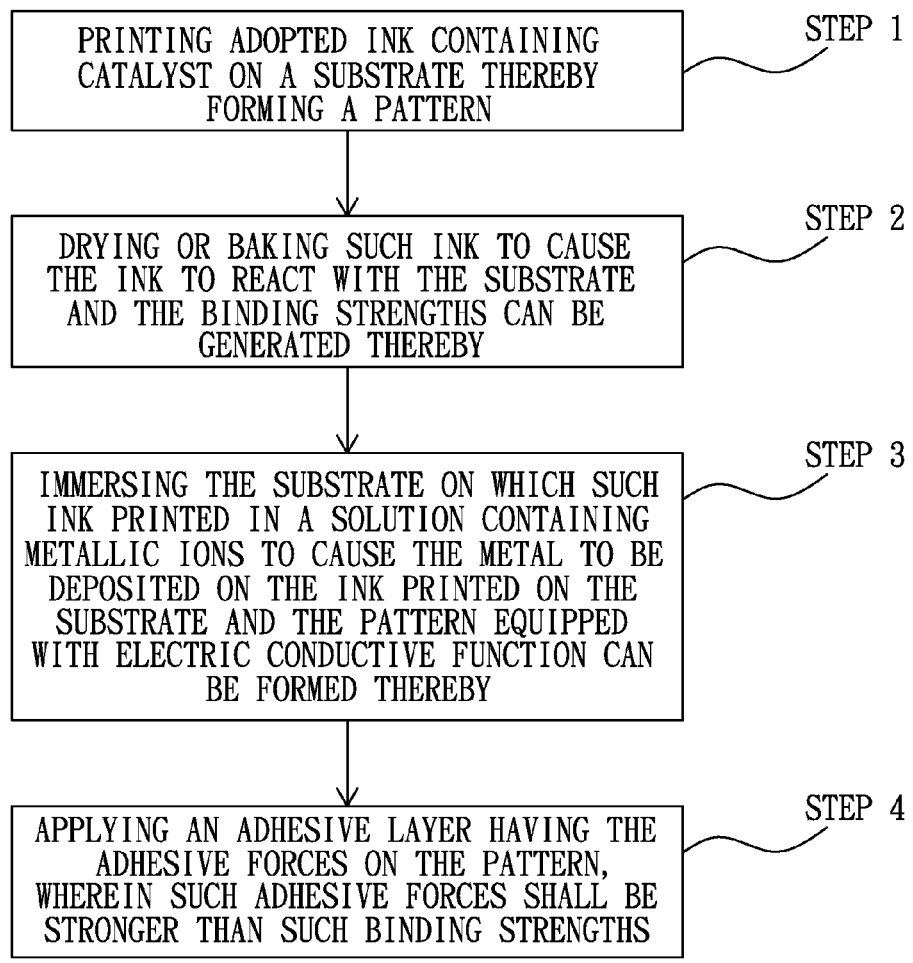
FIG. 4 is a flow chart illustrating the manufacture method of RFID tag structure having anti-reuse function according to one preferred embodiment of the present invention.

The accompanying drawings are included to provide a further understanding of the invention, and are incorporated in and constitute a part of this specification. The drawings illustrate embodiments of the invention and, together with the description, serve to explain the principles of the invention, wherein FIG. 1 is a schematic view illustrating the application of a conventional RFID tag; FIG. 2 is a schematic cross sectional view illustrating the RFID tag structure having anti-reuse function according to one preferred embodiment of the present invention; FIG. 3 is a schematic view illustrating the RFID tag structure having anti-reuse function being separated from an article to be adhered according to one preferred embodiment of the present invention; and FIG. 4 is a flow chart illustrating the manufacture method of RFID tag structure having anti-reuse function according to one preferred embodiment of the present invention.

As shown in figures, the RFID tag structure having anti-reuse function provided by the present invention comprises a substrate 10; a pattern 20 and an adhesive layer 30.

The substrate 10 allows the pattern 20 to be provided thereon, and the substrate 10 can be a polyethylene terephthalate (PET), polyimide (PI), polyvinyl chloride (PVC) film, or a composite of the PET, PI, PVC film and a sticker.

The pattern 20 is provided on a surface of the substrate 10, e.g. but not limited to the bottom surface, and the pattern 20 can be e.g. but not limited to a RFID antenna pattern, which is formed by printing the adopted ink containing catalyst on the substrate 10 and then immersing it in a solution containing metallic ions (not shown in figures) to cause the metal to be deposited on such ink printed on the substrate 10; wherein, the ink containing catalyst can be e.g. but not limited to epoxy, the solution containing metallic ions can be e.g. but not limited to copper chloride ($CuCl_2$), copper sulfate ($CuSO_4$), nickel chloride ($NiCl_2$) or nickel sulfate ($NiSO_4$) solution, and the metal can be e.g. but limited to gold, silver, copper, aluminum or nickel.

The adhesive layer 30 is provided on a surface of the pattern 20 which is not in contact with the substrate 10, e.g. but not limited to the bottom surface, wherein the adhesive forces of the adhesive layer 30 are stronger than the binding strengths generated between the pattern 20 and the substrate 10, and the adhesive layer 30 is capable of being adhered on an article 40 to be adhered and a RFID tag is formed thereby. Wherein, the adhesive layer 30 can be dry adhesive or flexible adhesive, wherein the dry adhesive can be e.g. but not limited to superglue, thermosol, AB adhesive or instant adhesive, the flexible adhesive can be e.g. but not limited to rubber based adhesive or acrylic based adhesive; and the adhered article 40 can be e.g. but not limited to glass, steel plate, tile, acrylic plate, plastic plate or plastic film.

As shown in FIG. 3, when the RFID tag is separated from the adhered article 40, since the adhesive forces of the adhesive layer 30 are stronger than the binding strengths generated between the pattern 20 and the substrate 10, the substrate 10 is released from the adhered article 40, and the pattern 20 and the adhesive layer 30 are still remained on the adhered article 40. As such, the RFID tag is prevented from being reused thereby fulfilling the objective and purpose of anti-reuse and anti-counterfeit. Thus, the RFID tag structure having anti-reuse function provided by the present invention is novel when comparing to a conventional RFID tag structure.

Furthermore, the present invention discloses a manufacture method of RFID tag structure having anti-reuse function. Referring to FIG. 4, which is a flow chart illustrating the manufacture method of RFID tag structure having anti-reuse function according to one preferred embodiment of the present invention. According to the one preferred embodiment of the present invention, the manufacture method of RFID tag structure having anti-reuse function includes steps of: printing adopted ink containing catalyst on a substrate 10 thereby forming a pattern 20 (STEP 1); drying or baking such ink to cause the ink to react with the substrate 10 and the binding strengths can be generated thereby (STEP 2); immersing the substrate 10 on which such ink printed in a solution containing metallic ions to cause the metal to be deposited on the ink printed on the substrate 10 and the pattern 20 equipped with electric conductive function can be formed thereby (STEP 3); thereafter, applying an adhesive layer 30 having the adhesive forces on the pattern 20, wherein such adhesive forces shall be stronger than such binding strengths (STEP 4).

In the STEP 1, ink containing catalyst is adopted for being printed on the substrate 10 thereby forming the pattern 20; wherein the substrate 10 can be e.g. but not limited to a polyethylene terephthalate (PET), polyimide (PI), polyvinyl chloride (PVC) film, or a composite of the PET, PI, PVC film and a sticker, the ink containing catalyst can be e.g. but not limited to epoxy.

In the STEP 2 to the STEP 3, drying or baking the ink to cause the ink to react with the substrate 10 and the binding strengths can be generated thereby, then the substrate 10 on which such ink printed is immersed in a solution containing metallic ions to cause the metal to be deposited on the ink printed on the substrate 10 and the pattern 20 equipped with electric conductive function can be formed thereby; wherein such solution can be e.g. but not limited to copper chloride ($CuCl_2$), copper sulfate ($CuSO_4$), nickel chloride ($NiCl_2$) or nickel sulfate ($NiSO_4$) solution, and the metal can be e.g. but limited to gold, silver, copper, aluminum or nickel.

In the STEP 4, the adhesive layer 30 having the adhesive forces is applied on the pattern 20, and such adhesive forces are stronger than such binding strengths; wherein the adhesive layer 30 can be dry adhesive or flexible adhesive, the dry adhesive can be e.g. but not limited to superglue, thermosol, AB adhesive or instant adhesive, the flexible adhesive can be e.g. but not limited to rubber based adhesive or acrylic based adhesive; and the adhered article 40 can be e.g. but not limited to glass, steel plate, tile, acrylic plate, plastic plate or plastic film.

As what have been disclosed above, the RFID tag structure having anti-reuse function and manufacture method thereof provided by the present invention enjoys the differentiation of adhesive forces and binding strengths generated by different materials, so when a RFID tag which had been adhered on a flat surface is desired to be separated, the pattern formed on the RFID tag is released from the substrate because of the weaker binding strengths generated between the pattern formed on the RFID tag and the substrate, and the RFID tag can be prevented from being reused, thereby fulfilling the objective and purpose of anti-reuse and anti-counterfeit. Thus, the RFID tag structure having anti-reuse function and manufacture method thereof provided by the present invention is novel when comparing to the conventional arts.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A manufacture method of RFID tag structure having anti-reuse function, including steps of:

printing adopted ink containing catalyst on a substrate thereby forming a pattern;

drying or baking said ink to cause said ink to react with said substrate and the binding strengths being generated thereby;

immersing said substrate on which said ink printed in a solution containing metallic ions to cause said metal to be deposited on said ink and said pattern equipped with electric conductive function on said substrate; and thereafter, applying an adhesive layer having the adhesive forces on said pattern, and positioning said adhesive layer wherein said adhesive layer being separated from and not contacting said substrate, wherein said adhesive forces are stronger than said binding strengths.

2. The manufacture method of RFID tag structure having anti-reuse function as claimed in claim 1, wherein said substrate is a PET, PI, PVC film, or a composite of the PET, PI, PVC film and a sticker.

3. The manufacture method of RFID tag structure having anti-reuse function as claimed in claim 1, wherein said pattern is a RFID antenna pattern, said ink is epoxy.

4. The manufacture method of RFID tag structure having anti-reuse function as claimed in claim 1, wherein said solution is $CuCl_2$, $CuSO_4$, $NiCl_2$ or $NiSO_4$ solution, and said metal is gold, silver, copper, aluminum or nickel.

5. The manufacture method of RFID tag structure having anti-reuse function as claimed in claim 1, wherein said adhesive layer is dry adhesive or flexible adhesive, wherein said dry adhesive is superglue, thermosol, AB adhesive or instant adhesive, said flexible adhesive is rubber based adhesive or acrylic based adhesive.

* * * * *